March 8, 1955 G. C. F. ASKER 2,703,586
VALVE
Filed Oct. 2, 1952 2 Sheets-Sheet 1
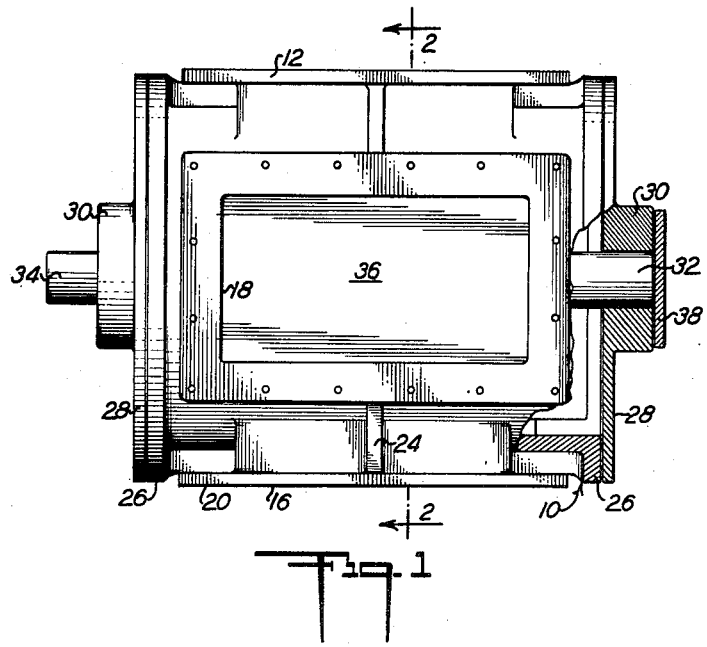
Fig. 1
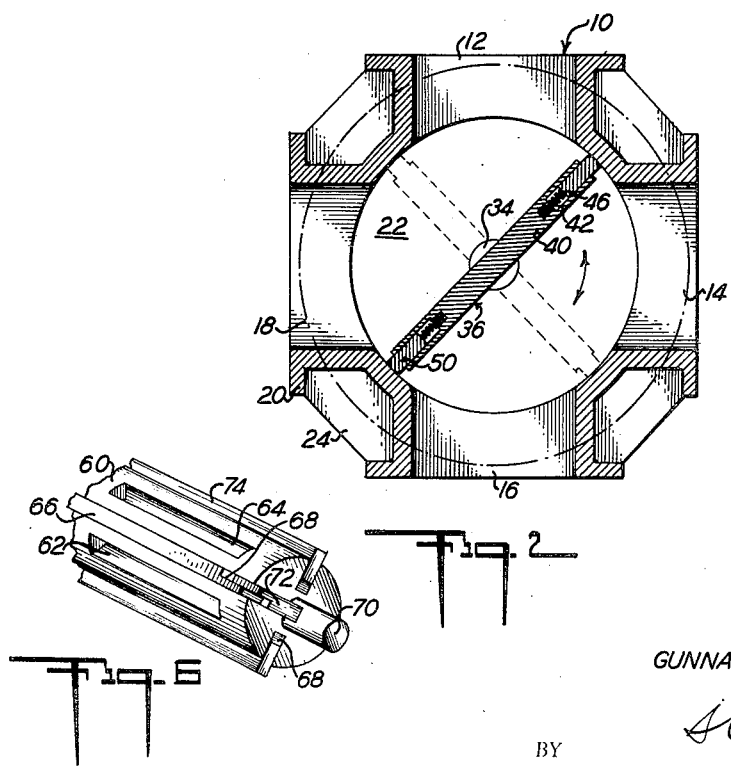
Fig. 2
Fig. 6
INVENTOR
GUNNAR ASKER
BY
ATTORNEY March 8, 1955 G. C. F. ASKER 2,703,586
VALVE
Filed Oct. 2, 1952 2 Sheets-Sheet 2
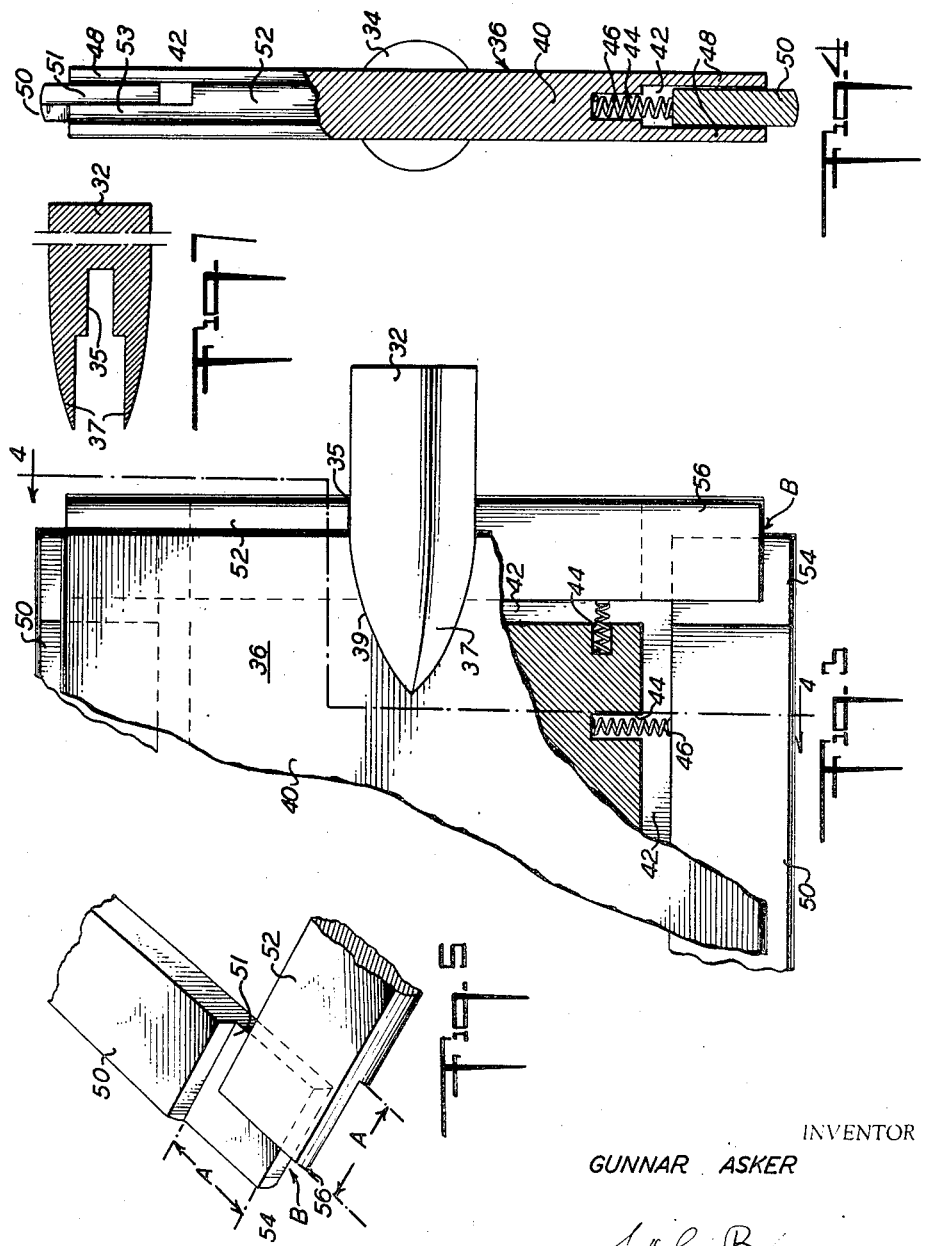
INVENTOR
GUNNAR ASKER
BY
ATTORNEY ര
United States Patent Office 2,703,586
Patented Mar. 8, 1955

1

2,703,586

VALVE

Gunnar C. F. Asker, Washington, D. C., assignor to Daly, Merritt & Sullivan, Inc., Falls Church, Va., a corporation of Delaware Application October 2, 1952, Serial No. 312,724

3 Claims. (Cl. 137—625.43)

This invention relates to improved seal construction for rotary elements of valves of the type which have a rotor mounted between valve ports to control the flow of fluid therethrough without leakage. More particularly, this invention relates to sealed rotor construction for rotor controlled valves wherein a resilient self-adjusting seal is mounted about a rotary vane or plug to effectively seal the same against the valve body walls axially or radially and desirably both.

The sealing means hereof may be used upon rotors mounted within a valve body having any number of valve ports for purposes of sealing the rotor against fluid leakage. In some rotary type valves, particularly for control of gas flow between ports the rotor is most desirably a relatively thin vane mounted diametrically as a planar wall completely within and about the axis of a generally cylindrical chamber. Such rotary vane is desirably sealed both radially at each side against the cylindrical walls of the valve chamber with which the ports communicate, as well as axially against each closed end of the cylindrical chamber. A typical valve construction using such vane is a four way valve such as the common so called "reversing valve," wherein the four ports are interconnected to pairs by proper positioning of the vane. The present sealing construction, allowing both radial and axial sealing, is outsanding for use with such valve.

In other rotary type valves, the rotor is a solid plug whose shape may vary from cylindrical to frustro-conical when the walls are tapered. Such plug usually has one or more passage ways cut through the body thereof to interconnect pairs of ports circumferentially arranged about the rotor. Such plugs are often made fluid tight by axial tension against the tapered shape of the plug within the rotor chamber and such tension tends to cause binding of the plug against the walls rendering rotation therein difficult. The presence of grit or other foreign bodies such as dust, or slight imperfections in the metal body often results in scoring of the walls and plug surfaces which aggravates the problem of sealing the rotor against leakage. Such plug is desirably sealed by similar sealing construction used for vane type seals and is highly desirable therein since the sealing elements hereof are adapted to maintain a sealing pressure against the walls to prevent binding of the plug and reduce the effect of foreign bodies to score the moving surfaces. In some plug constructions the ends of the plug are not completely enclosed within the valve body thus obviating the necessity of end seals, but where the plug is completely enclosed, end seals may be used in the same manner as used for vane type rotors.

Accordingly, a principal object of this invention is to provide sealing means upon a rotor element of a valve adapted to maintain the rotor sealed resiliently against the confining walls.

A further object is to provide a sealing means universally operative for radial or axial sealing of a rotor element in a valve which is resiliently mounted to maintain a constant sealing pressure against the valve housing walls and is self-adjusting to maintain the seal even after considerable wear.

A further object is to provide a rotor sealing means for both axially and radially sealing a valve rotor in a manner in which the seals cooperate for combined sealing action.

Other objects will be inherent in the description which is made in conjunction with the drawings hereof of which

2

Fig. 1 is an elevation of four-way vane rotor valve with portions broken away to show the relative position of the elements assembled therein;

Fig. 2 is a transverse section taken through about the center of the valve along the lines 2—2 of Fig. 1;

Fig. 3 shows the rotor vane with parts broken away to show mounting therewith of sealing elements both radially and axially; and Fig. 4 is a transverse section through the rotor with parts broken away to show the transverse positioning taken on the lines 4—4 of Fig. 3; and Fig. 5 is a detail showing the construction of mating ends of two sealing strips;

Fig. 6 is a detail of a plug rotor with seals mounted thereon;

Fig. 7 is a detail showing an inner end of a rotor supporting shaft.

As shown in Figs. 1 and 2, the valve body 10 has four ports 12, 14, 16, and 18, which as shown are symmetrically arranged in a common plane. The valve body is somewhat elongated for accommodating large ports allowing wide communication by mounting between gas ducts (not shown). Each valve port has outer flanges 20 thereabout and communicates centrally with a cylindrical valve chamber 22 within the valve body. The valve body may have reinforcing filaments or webs 24 for strong construction. Each cylindrical end of the valve body may be flanged at 26 over which are fitted cover plates 28 fastened thereto by any suitable means such as bolts (not shown). The end cover plates 28 have a boss 30 centrally integral therewith which serves as a bearing or which may further be provided with sleeves or other bearing elements (not shown) in which is mounted the ends of rotor supporting shafts 32 and 34. The shafts 32 and 34 are fastened for rotary support thereof within the cylindrical chamber 22 to a rotor element 36, which is thus mounted for rotation within the hubs 30 and supported by shafts 32 and 34 for rotation therein radially within the chamber 22 in either direction as shown by the arrows of Fig. 2.

The shafts 32 and 34 at their juncture with the rotor vane 40 are deeply notched at 35 as shown in Fig. 7 to loosely straddle a movable vane sealing element 52 within the notch 35, the inner ends thereof 37 being tapered and securely fastened to the rotor vane 40 as by welding at 39. The shaft 32 may also have suitably fastened an outer bearing cover plate 38.

Each rotor 36 comprises a solid plate 40 which is grooved, a similar pair of longitudinal slots 42 running from side to side in both ends of the plates 40 and a similar pair of grooves running from end to end in both sides thereof. Thus the plate 40 is continuously grooved all around the perimeter thereof and has several holes 44 in each groove near the ends thereof bored into the plate 40 a short distance inward from the bottom of each groove, each to receive by being snugly fitted therein a coiled spring 46 operative in compression for resilient thrust or expansion.

Each groove 42 further has fitted therein for sliding movement within the flanges 48 formed as side walls of each groove 42, a rotor sealing side plate 50 mounted to be slidable in the plane of the plate 40 within grooves 42 on opposite sides of the plate 40, to be thrust outwardly thereof by springs 46 or held inwardly thereof by the walls of the valve body against the compression of springs 46, for sealing radial movement of the rotor vane 40. The grooves 42 in the ends of the plate 40 each have an end sealing plate 52, similarly mounted for slidable movement against the compression of springs 46 for sealing the rotor axially within the valve body by resiliently bearing against the end cover plates 28 of the valve.

Each sealing plate 50 and 52 while generally rectangular and of a length to extend from end to end or side to side respectively of said plate 40 when mounted therein for outward thrust therefrom, have their mating ends each cut into opposite half thicknesses for sliding movement one against the other to form a rectangular mating seal at a side and end of the grooved rotor vane 40 where they meet. Accordingly, where the plates join, they matingly fit, each as a half of a seal one over the other, and cooperate to seal between them the juncture of the side and end walls of the cylindrical valve chamber 22. Thus, as shown in detail in Fig. 5 a sealing plate 50 is cut at the end 54 inward for a distance shown as A therein which corresponds to the width of a mating sealing plate 52 cut at its end 56. Thus each end 54 is a rectangular portion about ½ the thickness of the plate 50 and each end 56 is a complementary rectangular cut-away portion about ½ of the thickness of plate 52, the cut-away portions of each serving to receive the narrow portion at the end of the other. Each plate 50 and 52 is cut a depth of one half its total thickness whereby both plates may be matingly assembled to substantially the thickness of a single sealing plate and each end portion 54 and 56 is cut sufficiently thin, of course, to allow sliding movement clearance one over the other to cooperate as a seal at the intersecting corner of the rotor.

When not compressed by the confining walls of the valves, sealing plates 50 and 52 are thrust a maximum distance outwardly of the grooves 42 whereby the mating ends 54 and 56 form between them at the very corner junction an open portion B indicated by the arrow in Figs. 3 and 5. However, when the rotor 36 is assembled within the valve body both plates 50 and 52 are held inwardly by the walls of the valve chamber within their grooves 42 and the springs 46 are compressed by the end plates 28 and cylindrical side walls of the valve body as the rotor is normally confined thereby within chamber 22, whereby the sealing plates 50 and 52 closely mate and the open portion B is removed since the vanes then meet at a single point.

As thus described, the rotor 36 is mounted for rotary movement in the valve. The side sealing plates 50 are compressed by spring 46 to thrust the same outwardly of the rotor plate 40 against the cylindrical walls of the valve body to maintain a firm but resilient seal by the constant pressure of the springs 46 in compression thereagainst, as shown in Fig. 2. Similarly, the end plates 52 are thrust by springs 46 outwardly of the groove 42 and axially against the end cover plates 28 to maintain a seal thereagainst under constant resilient pressure.

In operation gas or other fluid ducts are fitted over the flanges 20 of each of the four ports 12, 14, 16, and 18. Suitable rotating means such as a hand wheel or lever is keyed or clamped to the protruding shaft 34 of the assembled valve whereby the vane 36 is manually or mechanically rotated to any desired position such as shown in the full line position of Fig. 2 whereby ports 12 and 18 are interconnected and simultaneously ports 14 and 16 are interconnected. Alternatively, the valve position may be as in the dotted line position of Fig. 2 wherein ports 12 and 14 are interconnected and while interconnecting ports 16 and 28. As will be seen the plates 50 maintain a continuous outwardly sealing pressure against the cylindrical walls of the valve chamber 22 sealing the chamber against passage of gas or other fluid so that no gas flows radially by the seal and simultaneously the axial ends of a rotor vane 36 is sealed by the sealing plates 52 thereby preventing gas or other fluid from flowing around an axial end. Any wear of the sealing plates 50 and 52 is accommodated by expansion of the springs which maintain a constant pressure against these plates outwardly of the groove 42 against the walls of the valve chamber 22.

As indicated the rotor 36 may be a solid plug instead of a plate 40 as described above. This modification is illustrated in the detail of Fig. 6. As thus shown, a rotary tapered valve plug body 60 has conduit portions cut into the cylindrical and frustro-conical walls therein at 62 and 64 each of which terminates in an adjacent quadrant of the valve plug wall as is conventional in the art. Thus the conduit opening 62 communicates with 64 by a conduit cut through the plug body. In opposite quadrant portions of the plug there are two similar interconnected openings comprising a conventional four-way valve plug. For this modification similar to construction for the vane 36 the plug 60 may have sealing plate vanes 66 resiliently mounted on opposite sides of the plug 60 within grooves 68 by springs placed beneath each sealing plate vane 66, the other longitudinal plate vane on the opposite side of the plug (not shown) symmetrically corresponding thereto in all respects for outward thrust against the valve wall by springs as described for the rotor vane construction 36 referred to above. The plug is mounted for rotation in a similar valve body 10 in any conventional manner such as between a pair of spindle shafts 70. Even as shown for the vane type rotor, the plug may also have end sealing vanes 72 mounted for axial sealing pressure against end walls of the valve if it has end walls. For this purpose the end vane 72 would similarly have its ends reduced to half sections to mate with the half section ends of the longitudinal vane 66 in the same manner as shown in detail in Fig. 5. Where the rotary plug valve is not constructed with ends enclosed within a housing about the plug, the end sealing plate vanes may be omitted, in which case a single longitudinal plate vane construction, shown as plate vane 74 may be used, resiliently mounted as other plate vanes within a groove 68 longitudinally extending the full length of the annular wall of the plug 60. But such vanes 74, of course, need not have its ends reduced for mating with an end seal. For plug valves that tend to bind against the walls it is sometimes desirable to have both an end seal type vane which may be a single pair of end seal plate vanes 72 mounted diametrically across each end of the plug as shown which cooperates with one pair of plate vanes 66 as shown together with alternate vanes 74 at the intermediate quadrant positions, so that the valve has four longitudinally extending resiliently mounted vanes disposed in each quarter of the annular walls of the plug 60, only two vanes 66 of which cooperate with end plate vanes 72 mounted diametrically across each end thereof. Thus 2 or 4 resiliently mounted longitudinal seals may be provided as desired, the greater number of seals serving to evenly space and support the plug resiliently within its housing for rotary seal movement without binding or scoring against the annular valve walls.

Certain modifications will occur to those skilled in the art. The valve embodying this principle may be changed in shape, the symmetry thereof may be modified, the ports and flanges thereabout may be made wider, narrower, oval, or circular as desired. The rotor itself may be expanded to substantial thickness and may be even made cylindrical or tapered as the frustum of a cone, with the ports cooperating with the passage ways cut into such plug in a manner known in the art. The valve may be constructed more or less sturdily to withstand substantial pressures if desired. The strength of the springs 46 may be varied to supply a desired sealing pressure to the sealing vanes and the valve moreover may be constructed of various metal alloy compositions. The sealing vane plates may similarly be of hard wearing metal but may be constructed of softer materials such as relatively rigid and wear resistant plastic. It will be appreciated that after the valve has worn to an extent that much of the body of the sealing vanes have worn away, they may be replaced.

I claim:

1. A valve comprising a valve body enclosing a substantially cylindrical chamber, a plurality of valve ports in said body communicating with said chamber, a rotor element mounted for rotation in said chamber, extending substantially from end to end and diametrically from side to side to at least diametrically substantially fill said chamber, controlling the flow of fluid between said valve ports by interconnection thereof upon rotation of said rotor, said rotor having a single deep cut relatively thin groove in the outer surface perimetrically disposed thereabout in the plane of the axis of said rotor, four relatively thin sealing plates each lying in an opposite grooved portion in the sides and ends to perimetrically extend from said grooves bounding said rotor, said grooves being of a depth sufficient to substantially completely house each of said plates, each of said sealing plates having approximately one half of their thickness cut away at each end thereof to slidingly mate within said groove with each other plate at each intersecting side and end portion of said rotor and means for resiliently biasing each of said plates outwardly of said rotor against said chamber walls to form a continuous resiliently biased seal of said rotor element against the chamber walls.

2. Valve structure as defined in claim 1 wherein the rotor element is a vane comprising a relatively thin plate of substantially rectangular shape having said groove running as a continuous groove in each side and end around its perimeter.

3. The valve as defined in claim 1 wherein the rotor is a solid metallic plug substantially cylindrically shaped to fit within and substantially entirely fill said valve chamber with easy rotative clearance from the walls thereof, said plug having fluid passageways cut in the body thereof to interconnect radially disposed valve ports in the walls of said chamber upon rotation thereof.

References Cited in the file of this patent

UNITED STATES PATENTS

| | | |
|---|---|---|
| 1,841,568 | Bradley | Jan. 19, 1932 |
| 2,389,670 | Kerr | Nov. 27, 1945 |